United States Patent
Borghetti et al.

(10) Patent No.: US 10,624,165 B1
(45) Date of Patent: Apr. 14, 2020

(54) CIRCUIT FOR PROVIDING POWER TO TWO OR MORE STRINGS OF LEDS

(71) Applicant: Infineon Technologies AG, Neubiberg (DE)

(72) Inventors: Fausto Borghetti, Sant'Ambrogiodi Valpolicella (IT); Ramdas Rangnath Ugale, Pune (IN); Francesco Vaiti, Munich (DE); Gernot Unterweger, Latschach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/584,273

(22) Filed: Sep. 26, 2019

(51) Int. Cl.
  *H05B 33/08* (2006.01)
  *H02M 3/07* (2006.01)
  *H02M 1/00* (2006.01)

(52) U.S. Cl.
  CPC .......... *H05B 33/0815* (2013.01); *H02M 3/07* (2013.01); *H05B 33/0812* (2013.01); *H02M 2001/0045* (2013.01)

(58) Field of Classification Search
  CPC ............ H05B 33/0812; H05B 33/0815; H05B 33/0842; H05B 33/0827; H05B 33/0845; H05B 33/0887; H02M 1/44; H02M 3/33561; H02M 3/07; H02M 2201/0009; H02M 2001/0045; B60Q 1/00; B60Q 3/00; B60Q 2400/30; G60Q 1/1415; Y02B 20/346
  See application file for complete search history.

(56) References Cited

U.S. PATENT DOCUMENTS

| | | | |
|---|---|---|---|
| 7,276,861 B1 * | 10/2007 | Shteynberg et al. | |
| 8,730,228 B2 * | 5/2014 | Yonemaru et al. | |
| 9,296,332 B2 * | 3/2016 | Krick et al. | |
| 10,348,191 B2 * | 7/2019 | Giuliano | |
| 10,383,185 B2 * | 8/2019 | Guth | |

OTHER PUBLICATIONS

"Buck-boost converter using the STM32F334 Discovery kit," Application Note 4449, accessed from https://www.st.com/en/evaluation-tools/stm32f3discovery.html?sc=stm32f3discovery, Sep. 2014, 34 pp.

\* cited by examiner

*Primary Examiner* — Haissa Philogene
(74) *Attorney, Agent, or Firm* — Schumaker & Sieffert, P.A.

(57) ABSTRACT

This disclosure includes systems, methods, and techniques for controlling delivery of power to one or more strings of light-emitting diodes (LEDs). For example, a circuit includes a power converter unit configured to receive an input signal from a power source and generate a first output signal comprising a first voltage, a charge pump configured to receive at least a portion of the first output signal from the power converter unit and generate a second output signal comprising a second voltage, and a linear regulator configured to receive the second output signal from the charge pump and generate a third output signal comprising a third voltage.

20 Claims, 8 Drawing Sheets

US 10,624,165 B1

CIRCUIT FOR PROVIDING POWER TO TWO OR MORE STRINGS OF LEDS

TECHNICAL FIELD

This disclosure relates circuits for driving and controlling strings of light-emitting diodes.

BACKGROUND

Drivers are often used to control a voltage, current, or power at a load. For instance, a light-emitting diode (LED) driver may control the power supplied to a string of light-emitting diodes. Some drivers may include a Direct Current (DC) to DC power converter, such as a buck-boost, buck, boost, or another DC to DC converter. Such DC to DC power converters may be used to control and possibly change the power at the load based on a characteristic of the load. DC to DC power converters may be especially useful for regulating current through LED strings. In some cases, LED driver circuits may accept an input signal including an input current and an input voltage and deliver an output signal including an output current and an output voltage. In some such cases, an LED driver circuit may regulate at least some aspects of the input signal and the output signal, such as controlling the output current emitted by the LED driver circuit.

SUMMARY

In general, this disclosure is directed to devices, systems, and techniques for a circuit for driving two or more different light-emitting diode (LED) strings. For example, the circuit may include a power converter, one or more charge pumps, and a linear regulator. The power converter, the one or more charge pumps, and the linear regulator may be configured to generate one or more output signals such that the circuit may support one or more lighting modes using the respective two or more LED strings. The circuit is designed in a way that can eliminate an additional power converter in order to decrease a complexity level a of the circuit as compared to a circuit which includes the additional power converter. Additionally, the circuit is designed in a way that can limit an amount of power dissipated by the linear regulator, thus decreasing an amount of energy lost by the circuit as compared with a circuit where a respective linear regulator dissipates a greater amount of power. According to this disclosure, for example, the circuit may deliver the output signals to the two or more LED strings in very power-efficient way while limiting a complexity of the circuit by limiting a number of power converters included in the circuit.

In some examples, a circuit is configured to control current through one or more strings of LEDs. The circuit includes a power converter unit configured to receive an input signal from a power source and generate a first output signal including a first voltage, a charge pump configured to receive at least a portion of the first output signal from the power converter unit and generate a second output signal including a second voltage, and a linear regulator configured to receive the second output signal from the charge pump and generate a third output signal including a third voltage.

In some examples, a method includes receiving, by a power converter unit of a circuit configured to control current through one or more strings of LEDs, an input signal from a power source, generating, by the power converter unit, a first output signal including a first voltage, receiving, by a charge pump of the circuit, at least a portion of the first output signal from the power converter unit, generating, by the charge pump, a second output signal including a second voltage, receiving, by a linear regulator of the circuit, the second output signal from the charge pump, and generating, by the linear regulator, a third output signal including a third voltage.

In some examples, a system includes a power source, a first string of LEDs, a second string of LEDs, and a circuit configured to control current through the first string of LEDs and the second string of LEDs. The circuit includes a power converter unit configured to receive an input signal from the power source and generate a first output signal including a first voltage, a charge pump configured to receive at least a portion of the first output signal from the power converter unit and generate a second output signal including a second voltage, and a linear regulator configured to receive the second output signal from the charge pump and generate a third output signal including a third voltage.

The summary is intended to provide an overview of the subject matter described in this disclosure. It is not intended to provide an exclusive or exhaustive explanation of the systems, devices, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Some systems may use a power converter, such as a direct current (DC) to DC converter to control current supplied to a string of light emitting diodes (LEDs). This disclosure is directed to a circuit for driving two or more different LED strings, which may be controlled according to one or more lighting modes. For example, a first string of LEDs may provide one or more first lighting modes and a second string of LEDs may provide one or more second lighting modes. The circuit may provide one or more output signals to the first string of LEDs and the second string of LEDs such that each output signal of the one or more output signals corresponds to a respective lighting mode of the one or more first lighting modes and the one or more second lighting modes. The one or more output signals, in some cases, may each include a respective voltage magnitude and a respective current magnitude. The techniques and circuits described herein may be especially useful with vehicle lighting applications that include multiple strings of LEDs.

Figure 1:
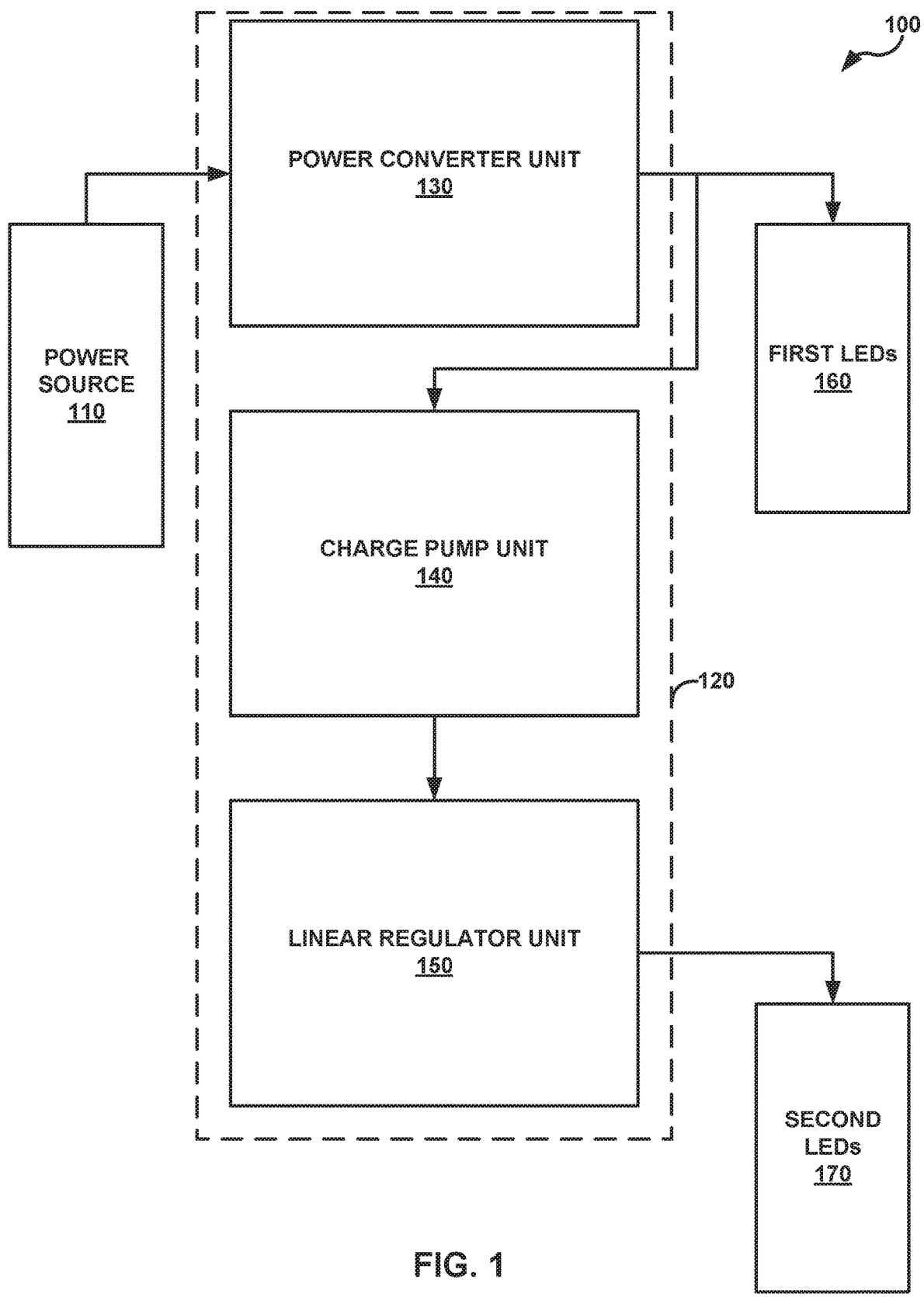
FIG. 1 is a block diagram illustrating an example system including a power source, a light-emitting diode (LED) driver circuit, first LEDs, and second LEDs, in accordance with one or more techniques of this disclosure.

FIG. 1 is a block diagram illustrating an example system 100 including a power source 110, an LED driver circuit 120, first LEDs 160, and second LEDs 170, in accordance with one or more techniques of this disclosure. As seen in FIG. 1, circuit 120 includes power converter unit 130, charge pump unit 140, and linear regulator unit 150.

Power source 110 is configured to deliver operating power to circuit 120. In some examples, power source 110 includes a battery and a power generation circuit to produce operating power. In some examples, power source 110 is rechargeable to allow extended operation. Power source 110 may include any one or more of a plurality of different battery types, such as nickel cadmium batteries and lithium ion batteries. In some examples, a maximum voltage output of power source 110 is approximately 12V. In some examples, power source 110 supplies power within a range from 10 Watts (W) to 15 W.

Circuit 120 may include circuit elements including resistors, capacitors, inductors, diodes, semiconductor switches, and other semiconductor elements. As illustrated in FIG. 1, circuit 120 includes power converter unit 130. Power source 110 may supply an input signal to power converter unit 130, thus, powering circuit 120. Furthermore, power converter unit 130 may provide at least a portion of a first output signal to first LEDs 160, which may represent a load supplied with energy by power converter unit 130. The input signal, in some cases, may include an input current and an input voltage. Additionally, the output signal may include an output current and an output voltage. In some cases, power converter unit 130 includes a DC-to-DC power converter configured to regulate the output signal delivered to first LEDs 160. In some examples, the DC-to-DC power converter includes a switch/inductor unit such as an H bridge. An H bridge uses a set of switches, often semiconductor switches, to convert electrical power. In some examples, the switch/inductor unit acts as a buck-boost converter. For instance, a buck-boost converter is configured to regulate the output voltage delivered to the first LEDs 160 using at least two operational modes including a buck mode and a boost mode. Power converter unit 130 may control semiconductor switches of the buck-boost converter to alternate the mode of the buck-boost converter (e.g., change the operation mode of the buck-boost converter from buck mode to boost mode and vice versa).

In the example illustrated in FIG. 1, the semiconductor switches of power converter unit 130 may include transistors, diodes, or other semiconductor elements. In buck mode, the buck-boost converter of power converter unit 130 may step down voltage and step up current from the input of power converter unit 130 to the output of power converter unit 130. In boost mode, the buck-boost converter of power converter unit 130 may step up voltage and step down current from the input of power converter unit 130 to the output of power converter unit 130. In some examples, power converter unit 130 is configured to regulate a current of the at least the portion of the first output signal delivered to the first LEDs 160 such that a current of the at least the portion of the first output signal remains substantially constant while an LED control switching element (not illustrated in FIG. 1) is activated.

Charge pump unit 140, in some examples, may include one or more capacitors which store charge in order to raise or lower voltage from an ingress point to an egress point of charge pump unit 140. In this way, charge pump unit 140 may be a power converter which accepts an input electrical signal and generates an output electrical signal having different parameter values than the input electrical signal. In some examples, charge pump unit 140 represents a Dickson charge pump including one or more "stages", where each stage of the one or more stages corresponds to a factor of multiplication in a voltage of the input electrical signal to charge pump unit 140. In some examples, charge pump unit 140 includes one stage and charge pump unit 140 multiplies a voltage of the input electrical signal by a factor of two. In some examples, charge pump unit 140 includes two stages and charge pump unit 140 multiplies a voltage of the input electrical signal by a factor of three. In some examples, charge pump unit 140 includes three stages and charge pump unit 140 multiplies a voltage of the input electrical signal by a factor of four. As such, each additional stage included in charge pump unit 140 represents an additional factor of multiplication in the voltage of an electrical signal passing through charge pump unit 140.

Charge pump unit 140 may receive at least a portion of the first output signal generated by power converter unit 130. In some examples, the first output signal includes a first voltage. In this way, a voltage of the electrical signal received by charge pump unit 140 may be substantially the same as a voltage of the electrical signal received by first LEDs 160. For example, the voltage of the electrical signal received by charge pump unit 140 may be within a range from 99% to 101% of the voltage of the electrical signal received by first LEDs 160. Charge pump unit 140 may generate a second output signal including a second voltage. In some examples, the second voltage is within a range from 1.9 times the first voltage to 2.1 times the first voltage (e.g., 2.0 times the first voltage). In some examples, the second voltage is within a range from 2.9 times the first voltage to 3.1 times the first voltage (e.g., 3.0 times the first voltage).

In some examples, linear regulator unit 150 is a circuit component which receives an input electrical signal and generates an output electrical signal, where the output electrical signal has a constant and predetermined voltage that does not change based on the voltage of the input to linear regulator unit 150. For example, a resistance of linear regulator unit 150 may change according to the voltage of the input to linear regulator unit 150, allowing linear regulator unit 150 to generate the output signal having the constant and predetermined voltage. Linear regulator unit 150 may receive the second output signal from charge pump unit 140 and generate a third output signal. In some examples, linear regulator unit 150 delivers the third output signal to second LEDs 170.

First LEDs 160 may include any suitable semiconductor light source. In some examples, an LED may include a p-n junction configured to emit light when activated. In some examples, first LEDs 160 may be included in a headlight assembly for automotive applications. For instance, first LEDs 160 may include a matrix, a string, or more than one string of light-emitting diodes to light a road ahead of a vehicle. As used herein, a vehicle may refer to motorcycles, trucks, boats, golf carts, snowmobiles, heavy machines, or any type of vehicle that uses directional lighting. In some examples, first LEDs 160 include a first string of LEDs including a set of high-beam (HB) LEDs and a set of low-beam (LB) LEDs. In some cases, system 100 may toggle between activating the set of HB LEDs, activating the set of HB LEDs, activating both the set of LB LEDs and the set of HB LEDs, and deactivating both the set of LB LEDs and the set of HB LEDs. First LEDs 160 may include any number of LEDs. For example, first LEDs 160 may include from 1 to 100 LEDs.

Second LEDs 170 may include any suitable semiconductor light source. In some examples, second LEDs 170 may be included in a headlight assembly for automotive applications. For instance, second LEDs 170 may include a matrix, a string, or more than one string of light-emitting diodes to emit light from a vehicle. In some examples, second LEDs 170 include a second string of LEDs including a set of daytime running light (DRL) LEDs and a set of position light (POS) LEDs. In some cases, system 100 may toggle between activating the set of DRL LEDs, activating the set of POS LEDs, activating both the set of DRL LEDs and the set of POS LEDs, and deactivating both the set of DRL LEDs and the set of POS LEDs. In some examples, second LEDs 170 may include a single set of LEDs that are configured to switch between a DRL mode and a POS mode. In some examples, DRL lighting (e.g., DRL LEDs) is mounted on the front of a vehicle and automatically activated once the vehicle itself is turned on. For example, DRL lighting may be activated at any time that the vehicle is powered up. DRL lighting may, in some cases, signal a presence of the vehicle to pedestrians and other vehicles, emitting principally white light. In some examples, POS lighting is activated only at night time. POS lighting may be used by all-terrain vehicle (ATV) original equipment manufacturers (OEMs) to differentiate car models from each other. In some examples, POS lighting represents dimmed DRL lighting (e.g., dimmed 10% from DRL lighting). Second LEDs 170 may include any number of LEDs. For example, second LEDs 170 may include from 1 to 100 LEDs.

In some examples, by using a single power converter unit 130 to deliver energy to both of first LEDs 160 and second LEDs 170, a complexity of circuit 120 may be decreased as compared to a circuit which uses a first power converter unit and a second power converter unit to deliver power to a first group of LEDs and a second group of LEDs, respectively. For example, since circuit 120 only includes a single power converter unit, circuit 120 may be smaller than a circuit which delivers power to two groups of LEDs and includes two power converters. Additionally, processing circuitry (not illustrated in FIG. 1) which controls power converter unit 130 may not require as much processing power as processing circuitry of a circuit which delivers power to two groups of LEDs and includes two power converters. It may be beneficial to include charge pump unit 140 in circuit 120, since charge pump unit 140 limit an amount of energy dissipated by linear regulator unit 150, thus ensuring that circuit 120 operates in a power-efficient manner.

Figure 2:
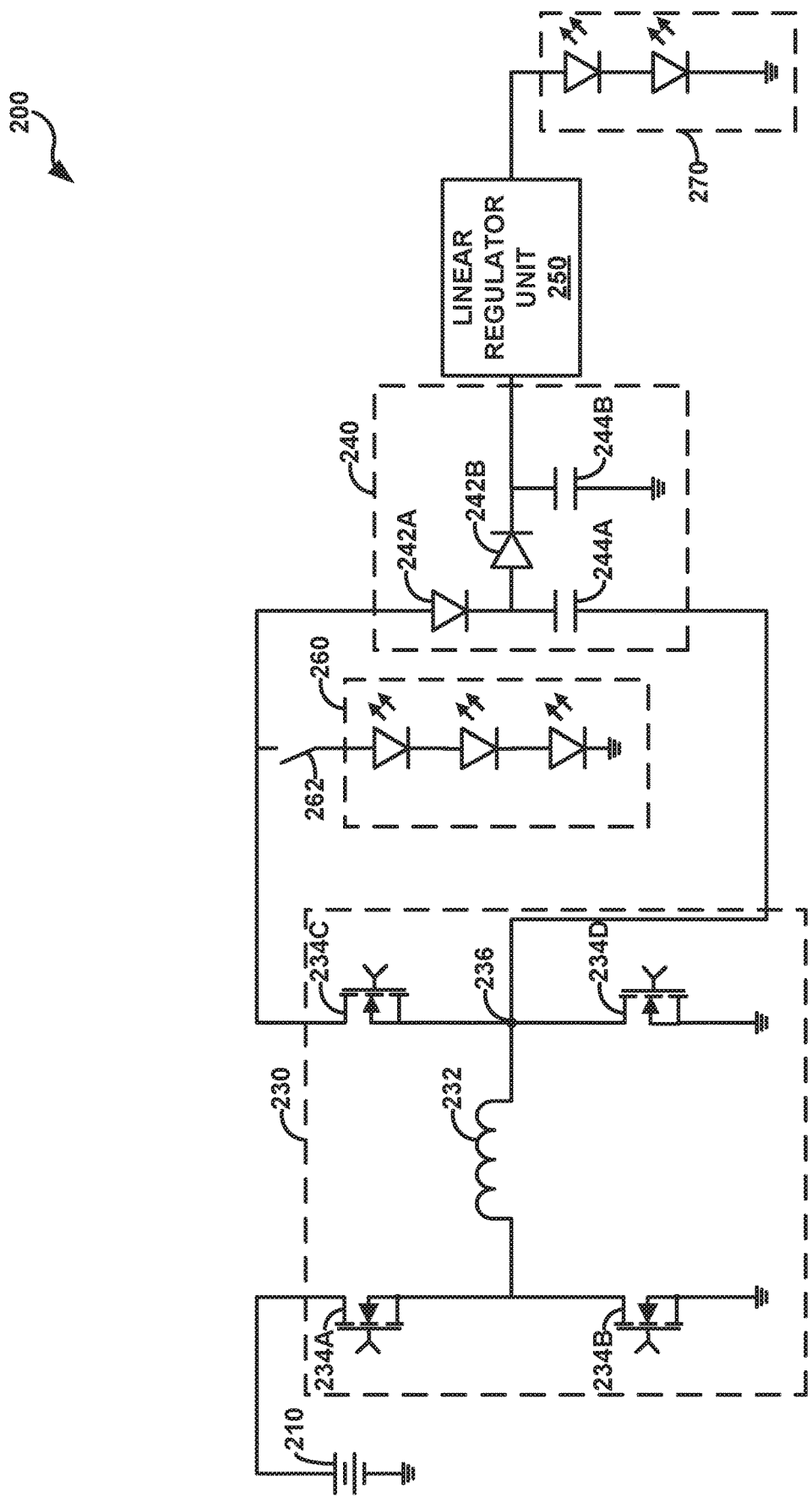
FIG. 2 is a circuit diagram illustrating a system including a circuit for providing power to a first string of LEDs and a second string of LEDs using a synchronous boost power converter unit, a single stage charge pump unit, and a linear regulator unit, in accordance with one or more techniques of this disclosure.

FIG. 2 is a circuit diagram illustrating a system 200 including a circuit for providing power to a first string of LEDs 260 and a second string of LEDs 270 using a synchronous boost power converter unit 230, a single stage charge pump unit 240, and a linear regulator unit 250, in accordance with one or more techniques of this disclosure. As illustrated in FIG. 2, system 200 includes power source 210, power converter unit 230, charge pump unit 240, linear regulator unit 250, first string of LEDs 260, LED control switching element 262, and second string of LEDs 270. Power converter unit 230 includes inductor 232 and switching elements 234A-234D (collectively, "switching elements 234"). Charge pump unit 240 includes first diode 242A and second diode 242B (collectively, "diodes 242") and first capacitor 244A and second capacitor 244B (collectively, "capacitors 244"). Power source 210 may be an example of power source 110 of FIG. 1. Power converter unit 230 may be an example of power converter unit 130 of FIG. 1. Charge pump unit 240 may be an example of charge pump unit 140 of FIG. 1. Linear regulator unit 250 may be an example of linear regulator unit 150 of FIG. 1. First string of LEDs 260 may be an example of first LEDs 160 of FIG. 1. Second string of LEDs 270 may be an example of second LEDs 170 of FIG. 1.

Power source 210 may supply an input signal to power converter unit 230. Power converter unit 230 may include a switch/inductor unit that acts as a synchronous boost converter (e.g., an H-bridge). The H-bridge may be represented by inductor 232 and switching elements 234. Each of switching elements 234 may, in some cases, include power switches such as, but not limited to, any type of field-effect transistor (FET) including any combination of metal-oxide-semiconductor field-effect transistors (MOSFETs), bipolar junction transistors (BJTs), insulated-gate bipolar transistors (IGBTs), junction field effect transistors (JFETs), high electron mobility transistors (HEMTs), or other elements that use voltage for control. Additionally, switching elements 234 may include n-type transistors, p-type transistors, and power transistors, or any combination thereof. In some examples, switching elements 234 include vertical transistors, lateral transistors, and/or horizontal transistors. In some examples, switching elements 234 include other analog devices such as diodes and/or thyristors. In some examples, switching elements 234 may operate as switches and/or as analog devices.

In some examples, each of switching elements 234 include three terminals: two load terminals and a control terminal. For MOSFET switches, each of switching elements 234 may include a drain terminal, a source terminal, and at least one gate terminal, where the control terminal is a gate terminal. For BJT switches, the control terminal may be a base terminal. Current may flow between the two load terminals of each of switching elements 234, based on the voltage at the respective control terminal. Therefore, electrical current may flow across switching elements 234 based on control signals delivered to the respective control terminals of switching elements 234. In one example, if a voltage applied to the control terminals of switching elements 234 is greater than or equal to a voltage threshold, switching elements 234 may be activated, allowing switching elements 234 to conduct electricity. Furthermore, switching elements 234 may be deactivated when the voltage applied to the respective control terminals of switching elements 234 is below the threshold voltage, thus preventing switching elements 234 from conducting electricity. A controller (not illustrated in FIG. 2) may be configured to independently control switching elements 234 such that one, a combination, all, or none of switching elements 234 may be activated at a point in time.

Switching elements 234 may include various material compounds, such as Silicon, Silicon Carbide, Gallium Nitride, or any other combination of one or more semiconductor materials. In some examples, silicon carbide switches may experience lower switching power losses. Improvements in magnetics and faster switching, such as Gallium Nitride switches, may allow switching elements 234 to draw short bursts of current from power source 210. These higher frequency switching elements may require control signals (e.g., voltage signals delivered by a controller (not illustrated in FIG. 2) to respective control terminals of switching elements 234) to be sent with more precise timing, as compared to lower-frequency switching elements.

Inductor 232 may comprise a component of power converter unit 230 according to the example illustrated in FIG. 2. Inductors are electrical circuit components that resist change in the amount of current passing through the inductor. In some examples, inductors include an electrically conductive wire wrapped in a coil. As current passes through the coil, a magnetic field is created in the coil, and the magnetic field induces a voltage across the inductor. An inductor defines an inductance value, and the inductance value is the ratio of the voltage across the inductor to the rate of change of current passing through the inductor. Therefore, when inductor 232 is charged with a magnetic field and placed in series with power source 210 and first string of LEDs 260, the voltage across inductor 232 is configured to boost the magnitude of the output voltage delivered to first string of LEDs 260.

The switch/inductor unit (e.g., inductor 232 and switching elements 234) may be configured to regulate the output voltage delivered to first string of LEDs 260 using at least one operational mode including a boost mode. In the example illustrated in FIG. 2, switching elements 234 may include transistors, diodes, or other semiconductor elements. In boost mode, the switch/inductor unit may step up voltage and step down current from the input of power converter unit 230 to the output of power converter unit 230. As such, power converter unit 230 may accept an input signal from power source 210 and generate a first output signal. The first output signal may include a first voltage and a first current, where the first voltage is greater than a voltage of the input signal and the first current is less than a current of the input signal when power converter unit is in the boost mode.

In some examples, while the switch/inductor unit is in boost mode, switching element 234A is activated, switching element 234B is deactivated, and switching element 234D alternates between being activated and being deactivated. When switching element 234D is activated, an electrical current flows from power source 210 through switching element 234A, inductor 232, and switching element 234D, charging inductor 232. When switching element 234D is deactivated, inductor 232 discharges and an electrical current flows from power source 210 through switching element 234A, inductor 232, and switching element 234C, thus stepping up (e.g., boost) an output voltage of the first output signal delivered to charge pump unit 240 and first string of LEDs 260. Additionally, during boost mode, power converter unit 230 may step down a current of the first output signal.

Power converter unit 230 may deliver at least a portion of the first output signal to charge pump unit 240. In this way, even though the first output signal is described as being an 'output,' the first output signal may function as an 'input' to charge pump unit 240. Charge pump unit 240, in some examples, may represent a Dickson charge pump that includes one stage of multiplication (e.g., two diodes and two capacitors), which substantially doubles a voltage of the electrical signal passing through charge pump unit 240 from an ingress point of charge pump unit 240 to an egress point of charge pump unit 240. In this way, charge pump unit 240 may be referred to herein as a "voltage multiplier," since charge pump unit 240 boosts voltage by an integer factor. For example, charge pump unit 240 may generate a second output signal including a second voltage and a second current. The second voltage, in some cases, may be within a range from 1.9 times the voltage of the first output signal generated by power converter unit 230 to 2.1 times the voltage of the first output signal.

In some examples, charge pump unit 240 receives a charge pump control signal from power converter unit 230. The charge pump control signal may allow charge pump unit 240 to boost the voltage of the electrical signal passing through charge pump unit 240. For example, the charge pump control signal may represent an electrical signal that flows from node 236 to first capacitor 244A, the charge pump control signal controlling when first capacitor 244A discharges. The charge pump control signal may represent an electrical signal having one or more first phases and one or more second phases. During the one or more first phases, a voltage of the charge pump control signal may be lower than a voltage of the charge pump control signal during the one or more second phases. In some examples, during a first phase of the one or more first phases, capacitor 244A charges to a voltage of the first output signal generated by power converter unit 230 via first diode 242A. In response to the charge pump control signal transitioning to a second phase of the one or more second phases that is subsequent to the first phase, a voltage at a "top plate" of first capacitor 244A (e.g., the plate of first capacitor 244A that is closer to diodes 242 than the "bottom plate," which is coupled to node 236) may boost to two times the voltage of the first output signal generated by power converter unit 230. In turn, second capacitor 244B may charge to two times the voltage of the first output signal generated by power converter unit 230 via second diode 242B. Subsequently, the charge pump control signal may transition to another first phase of the one or more first phases, causing the second capacitor 244B to discharge. In this way, a voltage of the second output signal generated by charge pump unit 240 is two times the voltage of the first output signal generated by power converter unit 230, since second capacitor 244B charges to two times the voltage of the first output signal.

Linear regulator unit 250 is configured to receive the second output signal generated by charge pump unit 240. In some examples, linear regulator unit 250 is a circuit component which receives an input electrical signal and generates an output electrical signal, where the output electrical signal has a constant and predetermined voltage that does not change based on the voltage and/or the current of the input to linear regulator unit 250. For example, a resistance of linear regulator unit 250 may change according to the voltage of the input to linear regulator unit 250, allowing linear regulator unit 250 to generate the output signal having the constant and predetermined voltage. Linear regulator unit 250 may receive the second output signal from charge pump unit 240 and generate a third output signal including a third voltage and a third current. In some examples, linear regulator unit 250 decreases (e.g., bucks) a voltage of the electrical signal which passes through linear regulator unit 250. In this way, the voltage of the third output signal may be lower than a voltage of the second output signal. In some examples, a difference between the voltage of the second output signal generated by charge pump unit 240 and the voltage of the third output signal generated by linear regulator unit 250 is smaller than a difference between the voltage of the first output signal generated by power converter unit 230 and the voltage of the second output signal generated by charge pump unit 240.

In some examples, it may be beneficial to limit a difference between the voltage of the second output signal and the voltage of the third output signal. For example, because linear regulator unit 250 may include a resistance, energy is dissipated as heat when an electrical signal passes through linear regulator unit 250. A first difference between the voltage of the second output signal and the voltage of the third output signal may correspond to a first amount of energy dissipation from linear regulator unit 250 and a second difference between the voltage of the second output signal and the voltage of the third output signal may correspond to a second amount of energy dissipation from linear regulator unit 250. If the first difference is greater than the second difference, the first amount of energy dissipation is greater than the second amount of energy dissipation. Energy dissipation leads to inefficiency, since energy dissipated as heat can not be used to power electrical components. As such, power converter unit 230 and charge pump unit 240 may limit the difference between the voltage of the second output signal and the voltage of the third output signal such that the difference remains below a voltage difference threshold value, allowing linear regulator unit 250 to efficiently generate the third output signal.

In some examples, power converter unit 230 is configured to deliver, while LED control switching element 262 is activated, at least a portion of the first output signal to first string of LEDs 260. In some examples, the current of the electrical signal received by the first string of LEDs 260 is within a range from 50 milliamperes (mA) to 1,500 mA. The first string of LEDs 260 may, in some cases, include a set of HB LEDs and a set of LB LEDs. In some cases, system 100 may toggle between activating the set of LB LEDs, activating the set of HB LEDs, activating both the set of LB LEDs and the set of HB LEDs, and deactivating both the set of LB LEDs and the set of HB LEDs. In some examples, the first string of LEDs may include a single set of LEDs that is configured to operate in an LB mode, operate in an HB mode, operate in both the LB mode and the HB mode, or operate in neither of the LB mode or the HB mode. LED control switching element 262 may control whether the first string of LEDs 260 receives power from power converter unit 230. For example, if LED control switching element 262 is deactivated, first string of LEDs 260 may not receive sufficient power to provide LB lighting and/or HB lighting. If LED control switching element 262 is activated, first string of LEDs 260 may receive at least a portion of the first output signal generated by power converter unit 230, where the first output signal includes sufficient power for the first string of LEDs 260 to provide LB lighting and/or HB lighting. A controller (not illustrated in FIG. 2) may be configured to toggle the first string of LEDs 260 between any one, none, or both of LB mode and HB mode.

In some examples, linear regulator unit 250 is configured to deliver at least a portion of the third output signal to the second string of LEDs 270. In some examples, the third output signal includes a current within a range from 50 mA to 1,500 mA. The second string of LEDs 270 may, in some cases, include a set of daytime running light (DRL) LEDs and a set of position light (POS) LEDs. In some cases, system 200 may toggle between activating the set of DRL LEDs, activating the set of POS LEDs, activating both the set of DRL LEDs and the set of POS LEDs, and deactivating both the set of DRL LEDs and the set of POS LEDs. In some examples, the second string of LEDs 270 may switch between a DRL mode and a POS mode. In some examples, DRL lighting (e.g., DRL LEDs) is mounted on the front of a vehicle and automatically activated once the vehicle itself is turned on. For example, DRL lighting may be activated at any time that the vehicle is powered up. DRL lighting may, in some cases, signal a presence of the vehicle to pedestrians and other vehicles, emitting principally white light. In some examples, POS lighting is activated only at night time. POS lighting may be used by all-terrain vehicle (ATV) original equipment manufacturers (OEMs) to differentiate car models from each other. In some examples, POS lighting represents dimmed DRL lighting (e.g., dimmed 10% from DRL lighting).

Figure 3:
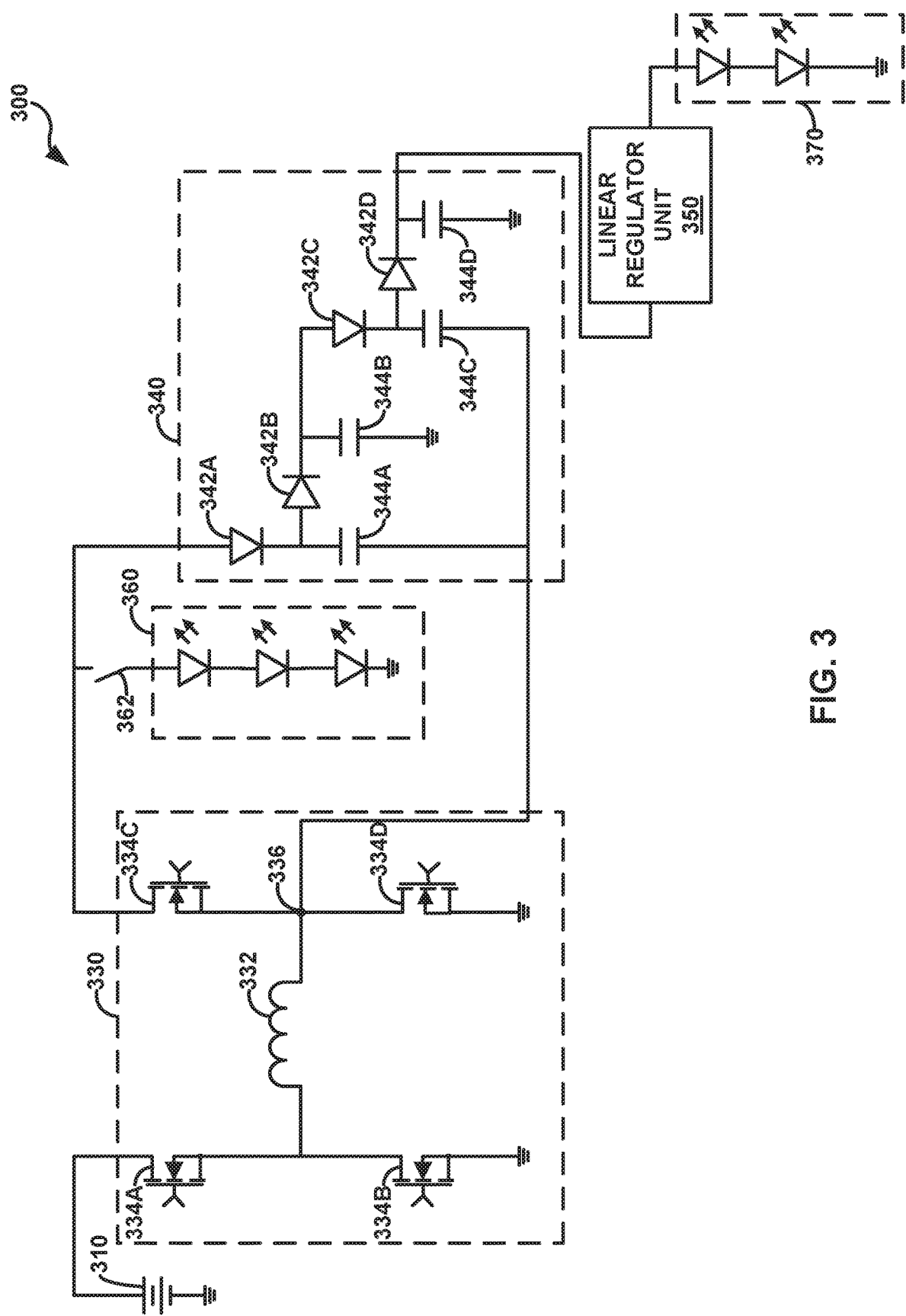
FIG. 3 is a circuit diagram illustrating a system including a circuit for providing power to a first string of LEDs and a second string of LEDs using a synchronous boost power converter unit, a multi-stage charge pump unit, and a linear regulator unit, in accordance with one or more techniques of this disclosure.

FIG. 3 is a circuit diagram illustrating a system 300 including a circuit for providing power to a first string of LEDs 360 and a second string of LEDs 370 using a synchronous boost power converter unit 330, a multi-stage charge pump unit 340, and a linear regulator unit 350, in accordance with one or more techniques of this disclosure. As illustrated in FIG. 3, system 300 includes power source 310, power converter unit 330, charge pump unit 340, linear regulator unit 350, first string of LEDs 360, LED control switching element 362, and second string of LEDs 370. Power converter unit 330 includes inductor 332 and switching elements 334A-334D (collectively, "switching elements 334"). Charge pump unit 340 includes first diode 342A, second diode 342B, third diode 342C, and fourth diode 342D (collectively, "diodes 342") and first capacitor 344A, second capacitor 344B, third capacitor 344C, and fourth capacitor 344D (collectively, "capacitors 344"). Power source 310 may be an example of power source 110 of FIG. 1. Power converter unit 330 may be an example of power converter unit 130 of FIG. 1. Charge pump unit 340 may be an example of charge pump unit 140 of FIG. 1. Linear regulator unit 350 may be an example of linear regulator unit 150 of FIG. 1. First string of LEDs 360 may be an example of first LEDs 160 of FIG. 1. Second string of LEDs 370 may be an example of second LEDs 170 of FIG. 1. System 300 may be substantially similar to the system 200 of FIG. 2, except that the charge pump unit 340 includes more than one stage of multiplication, whereas charge pump unit 240 of FIG. 2 includes a single stage of multiplication.

Power converter unit 330 may deliver at least a portion of a first output signal to charge pump unit 340. In this way, even though the first output signal is described as being an 'output,' the first output signal may function as an 'input' to charge pump unit 340. Charge pump unit 340, in some examples, may represent a Dickson charge pump that includes two stages of multiplication (e.g., four diodes and four capacitors), which substantially triples a voltage of the electrical signal passing through charge pump unit 340 from an ingress point of charge pump unit 340 to an egress point of charge pump unit 340. In this way, charge pump unit 340 may be referred to herein as a voltage multiplier, since charge pump unit 340 boosts voltage by an integer factor. For example, charge pump unit 340 may generate a second output signal including a second voltage and a second current. The second voltage, in some cases, may be within a range from 2.9 times the voltage of the first output signal generated by power converter unit 330 to 3.1 times the voltage of the first output signal. For example, the second voltage may be 3.0 times the voltage of the first output signal.

In some examples, charge pump unit 340 receives a charge pump control signal from power converter unit 330. The charge pump control signal may allow charge pump unit 340 to boost the voltage of the electrical signal passing through charge pump unit 340. For example, the charge pump control signal may represent an electrical signal that flows from node 336 to first capacitor 344A and third capacitor 344C, the charge pump control signal controlling when first capacitor 344A and third capacitor 344C discharge. The charge pump control signal may represent an electrical signal having one or more first phases and one or more second phases. During the one or more first phases, a voltage of the charge pump control signal may be lower than a voltage of the charge pump control signal during the one or more second phases. In some examples, during a first phase of the one or more first phases, capacitor 344A charges to a voltage of the first output signal generated by power converter unit 330 via first diode 342A. In response to the charge pump control signal transitioning to a second phase of the one or more second phases that is subsequent to the first phase, a voltage at a "top plate" of first capacitor 344A (e.g., the plate of first capacitor 344A that is closer to diodes 342 than the "bottom plate," which is coupled to node 336) may boost to two times the voltage of the first output signal generated by power converter unit 330. In turn, second capacitor 344B may charge to two times the voltage of the first output signal generated by power converter unit 330 via second diode 342B.

Subsequently, the charge pump control signal may transition to another first phase of the one or more first phases, causing the second capacitor 344B to discharge, charging third capacitor 344C to two times the voltage of the first output signal generated by power converter unit 330. The charge pump control signal may further transition to another second phase of the one or more second phases, causing a voltage at the top plate of third capacitor 344C to boost to three times the voltage of the first output signal generated by power converter unit 330. In turn, fourth capacitor 344D may charge to three times the voltage of the first output signal generated by power converter unit 330 via fourth diode 342D. After the charge pump control transitions to another first phase of the one or more first phases, fourth capacitor 344D discharges. In this way, a voltage of the second output signal generated by charge pump unit 340 is three times the voltage of the first output signal generated by power converter unit 330, since fourth capacitor 344D charges to three times the voltage of the first output signal.

Although charge pump unit 240 of FIG. 2 and charge pump unit 340 of FIG. 3 are described as having one stage of multiplication and two stages of multiplication, respectively, at least some systems not illustrated in FIGS. 2-3 may include more than two or less than two stages of multiplication.

Figure 4:
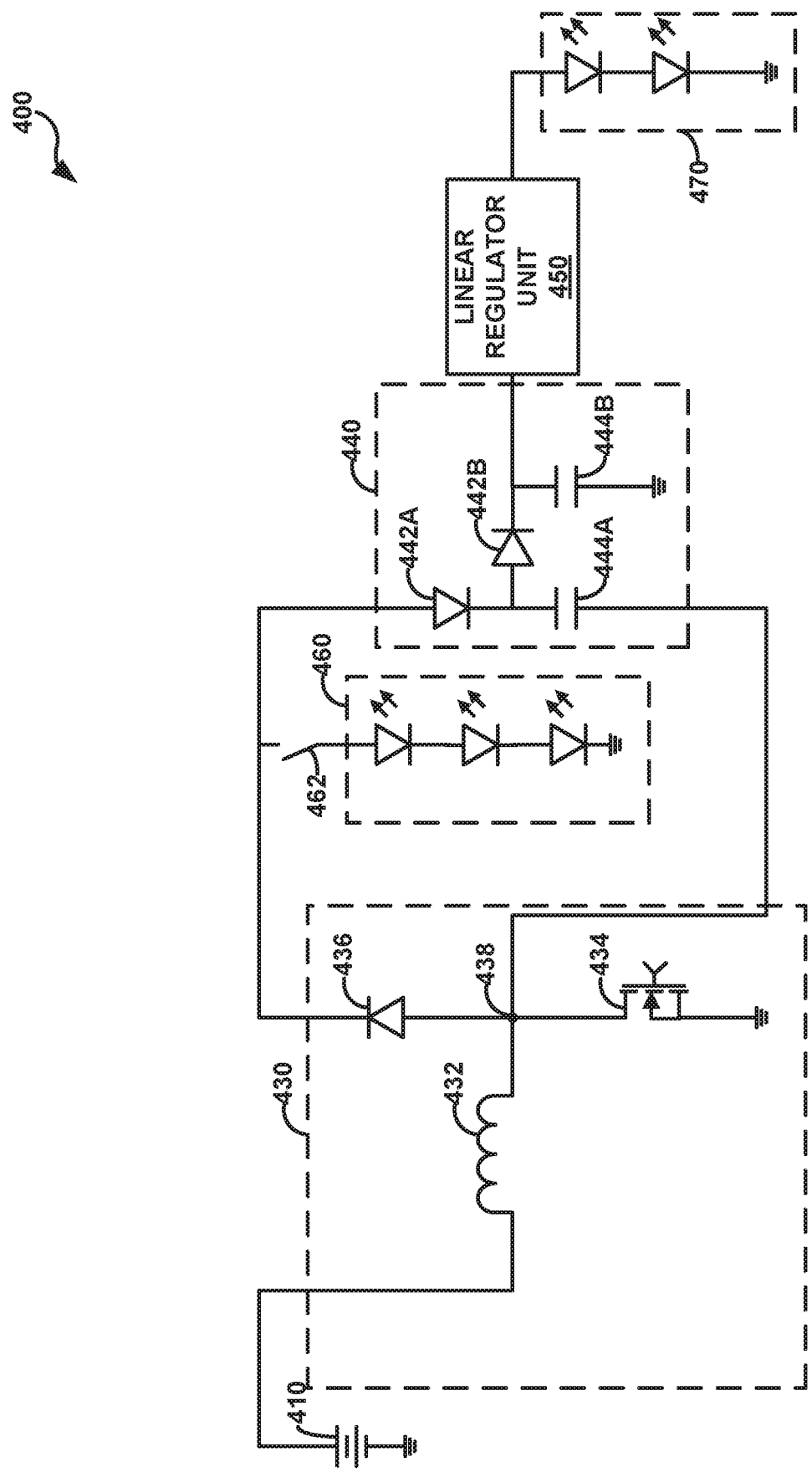
FIG. 4 is a circuit diagram illustrating a system including a circuit for providing power to a first string of LEDs and a second string of LEDs using an asynchronous boost power converter unit, a single stage charge pump unit, and a linear regulator unit, in accordance with one or more techniques of this disclosure.

FIG. 4 is a circuit diagram illustrating a system 400 including a circuit for providing power to a first string of LEDs 460 and a second string of LEDs 470 using an asynchronous boost power converter unit 430, a single stage charge pump unit 440, and a linear regulator unit 450, in accordance with one or more techniques of this disclosure. As illustrated in FIG. 4, system 400 includes power source 410, power converter unit 430, charge pump unit 440, linear regulator unit 450, first string of LEDs 460, LED control switching element 462, and second string of LEDs 470. Power converter unit 430 includes inductor 432, switching element 434, and diode 436. Charge pump unit 440 includes first diode 442A and second diode 442B (collectively, "diodes 442") and first capacitor 444A and second capacitor 444B (collectively, "capacitors 444"). Power source 410 may be an example of power source 110 of FIG. 1. Power converter unit 430 may be an example of power converter unit 130 of FIG. 1. Charge pump unit 440 may be an example of charge pump unit 140 of FIG. 1. Linear regulator unit 450 may be an example of linear regulator unit 150 of FIG. 1. First string of LEDs 460 may be an example of first LEDs 160 of FIG. 1. Second string of LEDs 470 may be an example of second LEDs 170 of FIG. 1. System 400 may be substantially similar to the system 200 of FIG. 2, except that power converter unit 430 represents a boost converter, whereas power converter unit 230 of FIG. 2 represents a buck-boost converter.

Power converter unit 430 may be configured to regulate the output voltage delivered to first string of LEDs 460 using at least one operational mode including a boost mode. In the example illustrated in FIG. 4, switching element 434 may include transistors, diodes, or other semiconductor elements. In boost mode, power converter unit 430 may step up voltage and step down current from the input of power converter unit 430 to the output of power converter unit 430. As such, power converter unit 430 may accept an input signal from power source 410 and generate a first output signal. The first output signal may include a first voltage and a first current, where the first voltage is greater than a voltage of the input signal and the first current is less than a current of the input signal. In some examples to boost the voltage of the electrical signal passing through power converter unit 430, switching element 434 alternates between being activated and being deactivated. When switching element 434 is activated, an electrical current flows from power source 410 through inductor 432 and switching element 434, charging inductor 432. When switching element 434 is deactivated, inductor 432 discharges and an electrical current flows from power source 410 through inductor 432 and diode 436 thus stepping up (e.g., boosting) an output voltage of the first output signal delivered to charge pump unit 440 and/or first string of LEDs 460. Additionally, power converter unit 430 may step down a current of the first output signal.

Figure 5:
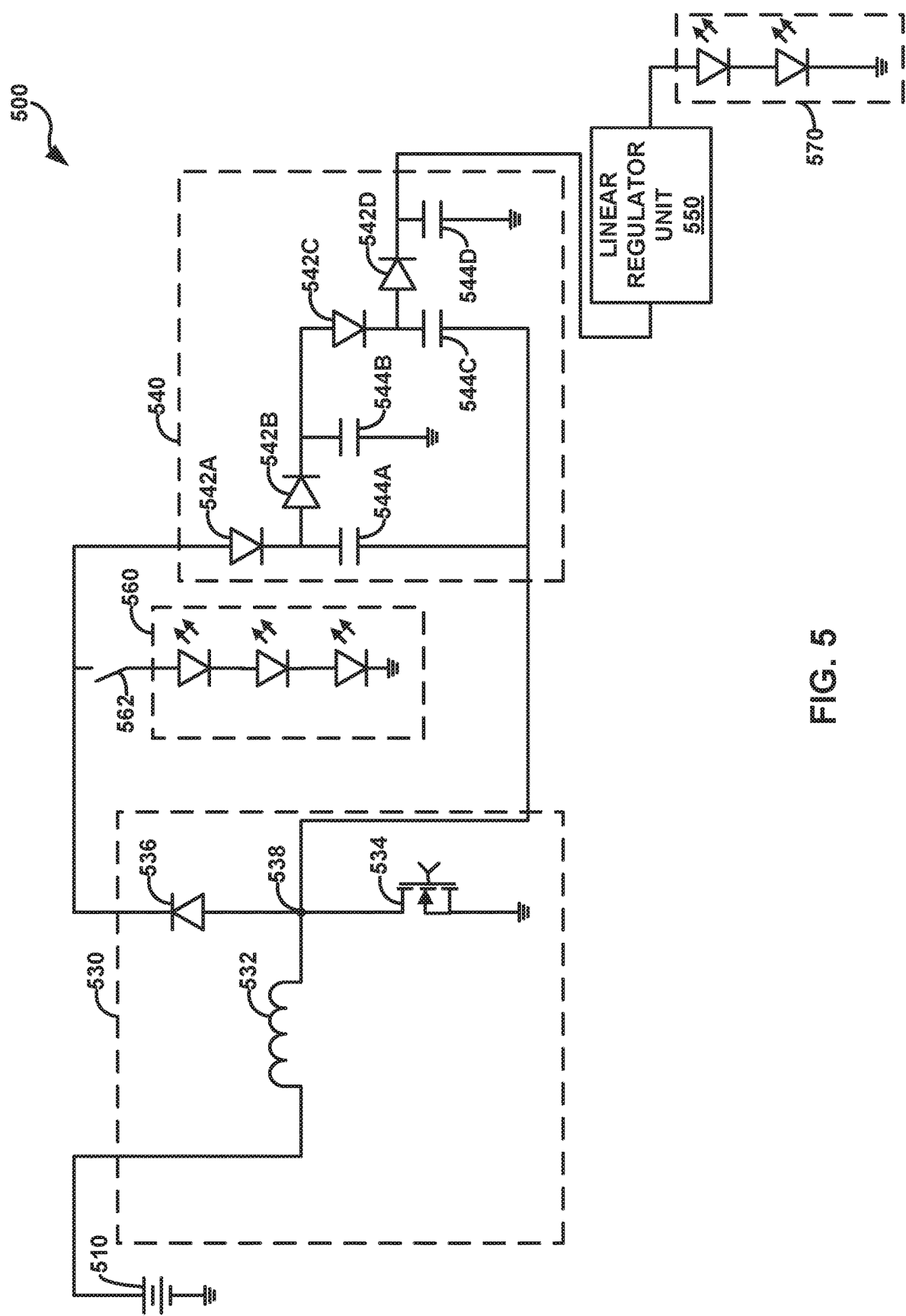
FIG. 5 is a circuit diagram illustrating a system including a circuit for providing power to a first string of LEDs and a second string of LEDs using an asynchronous boost power converter unit, a multi-stage charge pump unit, and a linear regulator unit, in accordance with one or more techniques of this disclosure.

FIG. 5 is a circuit diagram illustrating a system 500 including a circuit for providing power to a first string of LEDs 560 and a second string of LEDs 570 using an asynchronous boost power converter unit 530, a multi-stage charge pump unit 540, and a linear regulator unit 550, in accordance with one or more techniques of this disclosure. As illustrated in FIG. 5, system 500 includes power source 510, power converter unit 530, charge pump unit 540, linear regulator unit 550, first string of LEDs 560, LED control switching element 562, and second string of LEDs 570. Power converter unit 530 includes inductor 532, switching element 534, and diode 536. Charge pump unit 540 includes first diode 542A, second diode 542B, third diode 542C, and fourth diode 542D (collectively, "diodes 542") and first capacitor 544A, second capacitor 544B, third capacitor 544C, and fourth capacitor 544D (collectively, "capacitors 544"). Power source 510 may be an example of power source 110 of FIG. 1. Power converter unit 530 may be an example of power converter unit 130 of FIG. 1. Charge pump unit 540 may be an example of charge pump unit 140 of FIG. 1. Linear regulator unit 550 may be an example of linear regulator unit 150 of FIG. 1. First string of LEDs 560 may be an example of first LEDs 160 of FIG. 1. Second string of LEDs 570 may be an example of second LEDs 170 of FIG. 1. System 500 may be substantially similar to the system 300 of FIG. 3, except that power converter unit 530 represents a boost converter, whereas power converter unit 330 of FIG. 3 represents a buck-boost converter.

Power converter unit 530 may be configured to regulate the output voltage delivered to first string of LEDs 560 using at least one operational mode including a boost mode. In the example illustrated in FIG. 5, switching element 534 may include transistors, diodes, or other semiconductor elements. In boost mode, power converter unit 530 may step up voltage and step down current from the input of power converter unit 530 to the output of power converter unit 530. As such, power converter unit 530 may accept an input signal from power source 510 and generate a first output signal. The first output signal may include a first voltage and a first current, where the first voltage is greater than a voltage of the input signal and the first current is less than a current of the input signal. In some examples to boost the voltage of the electrical signal passing through power converter unit 530, switching element 534 alternates between being activated and being deactivated. When switching element 534 is activated, an electrical current flows from power source 510 through inductor 532 and switching element 534, charging inductor 532. When switching element 534 is deactivated, inductor 532 discharges and an electrical current flows from power source 510 through inductor 532 and diode 536 thus stepping up (e.g., boosting) an output voltage of the first output signal delivered to charge pump unit 540 and/or first string of LEDs 560. Additionally, power converter unit 530 may step down a current of the first output signal.

Figure 6:
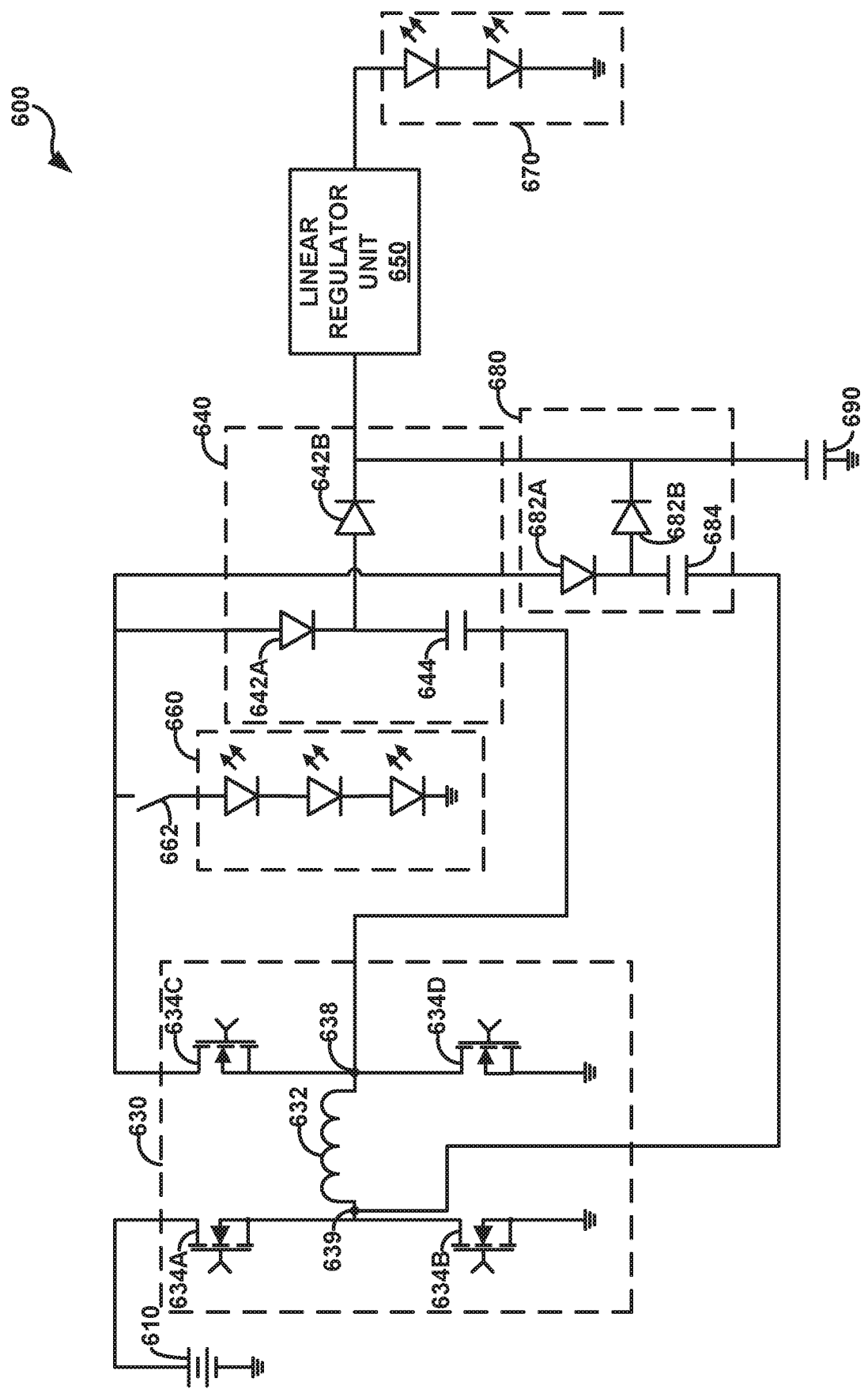
FIG. 6 is a circuit diagram illustrating a system including a circuit for providing power to a first string of LEDs and a second string of LEDs using a buck-boost power converter unit, a first single stage charge pump unit, a linear regulator unit, and a second single stage charge pump unit, in accordance with one or more techniques of this disclosure.

FIG. 6 is a circuit diagram illustrating a system 600 including a circuit for providing power to a first string of LEDs 660 and a second string of LEDs 670 using a buck-boost power converter unit 630, a first single stage charge pump unit 640, a linear regulator unit 250, and a second single stage charge pump unit 680, in accordance with one or more techniques of this disclosure. As illustrated in FIG. 6, system 600 includes power source 610, power converter unit 630, first charge pump unit 640, linear regulator unit 650, first string of LEDs 660, LED control switching element 662, second string of LEDs 670, second charge pump unit 680, and charge pump capacitor 690. Power converter unit 630 includes inductor 632 and switching elements 634A-634D (collectively, "switching elements 634"). First charge pump unit 640 includes first diode 642A and second diode 642B (collectively, "diodes 642") and a capacitor 644. (collectively, "capacitors 644"). Second charge pump unit 680 includes third diode 682A and fourth diode 682B (collectively, "diodes 682") and a capacitor 684. Power source 610 may be an example of power source 110 of FIG. 1. Power converter unit 630 may be an example of power converter unit 130 of FIG. 1. First charge pump unit 640, second charge pump unit 680, and charge pump capacitor 690 may be an example of charge pump unit 140 of FIG. 1. Linear regulator unit 650 may be an example of linear regulator unit 150 of FIG. 1. First string of LEDs 660 may be an example of first LEDs 160 of FIG. 1. Second string of LEDs 670 may be an example of second LEDs 170 of FIG. 1. System 600 may be substantially similar to the system 200 of FIG. 2, except that the system 600 includes a first charge pump unit 640 and a second charge pump unit 680, whereas system 200 of FIG. 2 includes a single charge pump unit 240.

Power converter unit 630 may be configured to operate in a buck mode and a boost mode. When power converter unit 630 is operating in the boost mode, first charge pump unit 640 may receive a first charge pump control signal from power converter unit 630. The first charge pump control signal may allow charge pump unit 640 to boost the voltage of the electrical signal passing through charge pump unit 640. For example, the first charge pump control signal may represent an electrical signal that flows from node 638 to capacitor 644, the first charge pump control signal controlling when capacitor 644 discharges. The first charge pump control signal may represent an electrical signal having one or more first phases and one or more second phases. During the one or more first phases, a voltage of the first charge pump control signal may be lower than a voltage of the first charge pump control signal during the one or more second phases. In some examples, during a first phase of the one or more first phases, capacitor 644 charges to a voltage of the first output signal generated by power converter unit 630 via first diode 642A. In response to the first charge pump control signal transitioning to a second phase of the one or more second phases that is subsequent to the first phase, a voltage at a top plate of capacitor 644 (e.g., the plate of capacitor 644 that is closer to diodes 642 than the bottom plate, which is coupled to node 638) may boost to two times the voltage of the first output signal generated by power converter unit 630. In turn, charge pump capacitor 690 may charge to two times the voltage of the first output signal generated by power converter unit 630 via second diode 642B. Subsequently, the first charge pump control signal may transition to another first phase of the one or more first phases, causing the charge pump capacitor 690 to discharge. In this way, a voltage of the second output signal generated by first charge pump unit 640 is two times the voltage of the first output signal generated by power converter unit 630, since the charge pump capacitor 690 charges to two times the voltage of the first output signal.

When power converter unit 630 is operating in the buck mode, second charge pump unit 680 may receive a second charge pump control signal from power converter unit 630. The second charge pump control signal may allow second charge pump unit 680 to boost the voltage of the electrical signal passing through second charge pump unit 680. For example, the second charge pump control signal may represent an electrical signal that flows from node 639 to capacitor 684, the second charge pump control signal controlling when capacitor 684 discharges. The second charge pump control signal may represent an electrical signal having one or more first phases and one or more second phases. During the one or more first phases, a voltage of the second charge pump control signal may be lower than a voltage of the second charge pump control signal during the one or more second phases. In some examples, during a first phase of the one or more first phases, capacitor 684 charges to a voltage of the first output signal generated by power converter unit 630 via third diode 682A. In response to the second charge pump control signal transitioning to a second phase of the one or more second phases that is subsequent to the first phase, a voltage at a top plate of capacitor 684 may boost to two times the voltage of the first output signal generated by power converter unit 630. In turn, charge pump capacitor 690 may charge to two times the voltage of the first output signal generated by power converter unit 630 via fourth diode 682B. Subsequently, the second charge pump control signal may transition to another first phase of the one or more first phases, causing the charge pump capacitor 690 to discharge. In this way, a voltage of the second output signal generated by second charge pump unit 680 is two times the voltage of the first output signal generated by power converter unit 630, since the charge pump capacitor 690 charges to two times the voltage of the first output signal.

In this way, first charge pump unit 640 may be used to generate a second output signal to deliver to linear regulator unit 650 when power converter unit 630 is operating in the buck mode. By the same token, second charge pump unit 680 may be used to generate the second output signal to deliver to linear regulator unit 650 when power converter unit 630 is operating in the boost mode.

Figure 7:
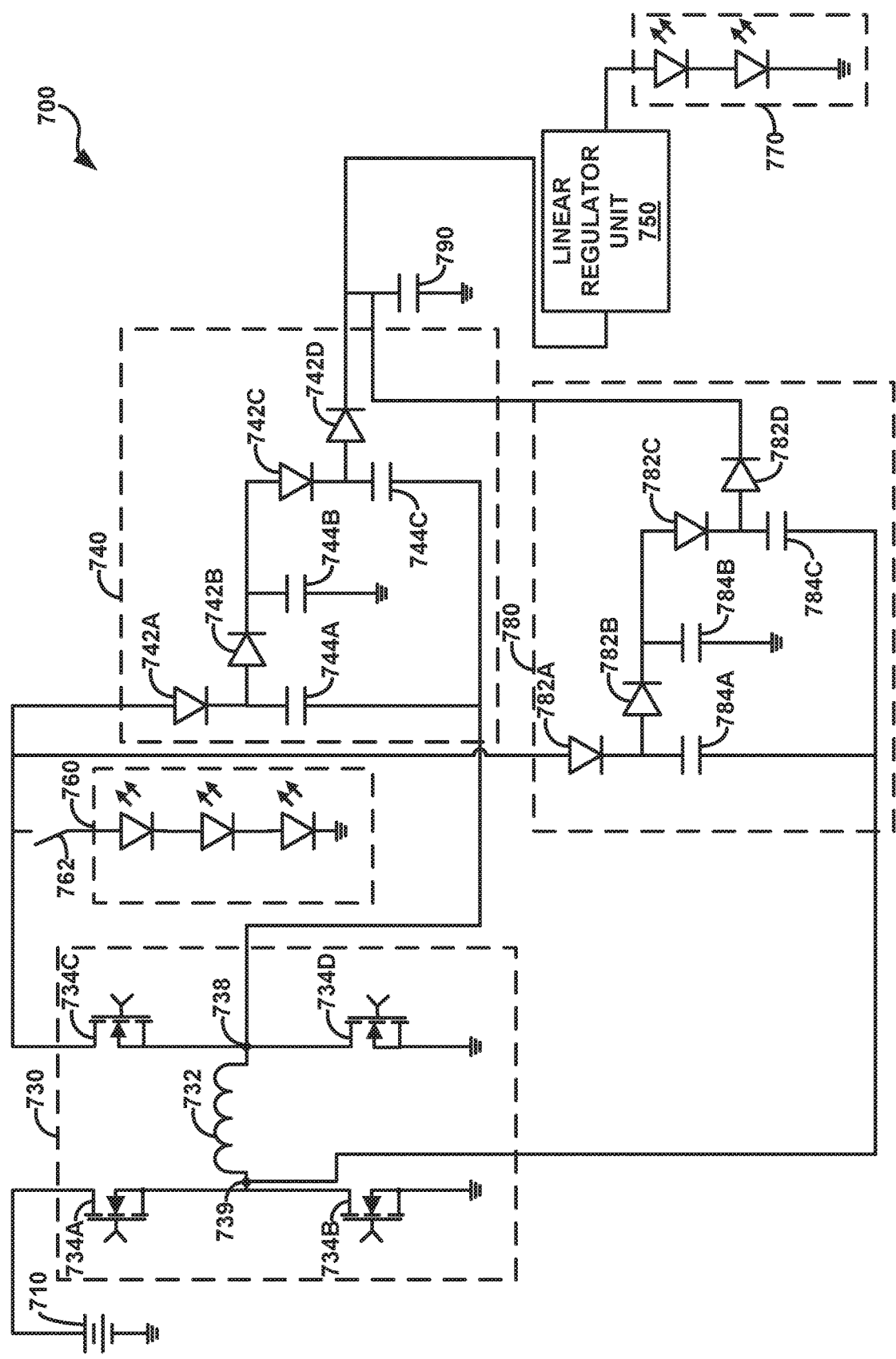
FIG. 7 is a circuit diagram illustrating a system including a circuit for providing power to a first string of LEDs and a second string of LEDs using a buck-boost power converter unit, a first multi-stage charge pump unit, a linear regulator unit, and a second multi-stage charge pump unit, in accordance with one or more techniques of this disclosure.

FIG. 7 is a circuit diagram illustrating a system 700 including a circuit for providing power to a first string of LEDs 760 and a second string of LEDs 770 using a buck-boost power converter unit 730, a first multi-stage charge pump unit 740, a linear regulator unit 350, and a second multi-stage charge pump unit 780, in accordance with one or more techniques of this disclosure. As illustrated in FIG. 7, system 700 includes power source 710, power converter unit 730, first charge pump unit 740, linear regulator unit 750, first string of LEDs 760, LED control switching element 762, second string of LEDs 770, second charge pump unit 780, and charge pump capacitor 790. Power converter unit 730 includes inductor 732 and switching elements 734A-734D (collectively, "switching elements 734"). First charge pump unit 740 includes first diode 742A, second diode 742B, third diode 742C, and fourth diode 742D (collectively, "diodes 742") and first capacitor 744A, second capacitor 744B, and third capacitor 744C (collectively, "capacitors 744"). Second charge pump unit 780 includes first diode 782A, second diode 782B, third diode 782C, and fourth diode 782D (collectively, "diodes 782") and first capacitor 784A, second capacitor 784B, and third capacitor 784C (collectively, "capacitors 784"). Power source 710 may be an example of power source 110 of FIG. 1. Power converter unit 730 may be an example of power converter unit 130 of FIG. 1. First charge pump unit 740, second charge pump unit 780, and charge pump capacitor 790 may be an example of charge pump unit 140 of FIG. 1. Linear regulator unit 750 may be an example of linear regulator unit 150 of FIG. 1. First string of LEDs 760 may be an example of first LEDs 160 of FIG. 1. Second string of LEDs 770 may be an example of second LEDs 170 of FIG. 1. System 700 may be substantially similar to the system 300 of FIG. 3, except that the system 700 includes a first charge pump unit 740 and a second charge pump unit 780, whereas system 300 of FIG. 3 includes a single first charge pump unit 740.

Power converter unit 730 may be configured to operate in a buck mode and a boost mode. When power converter unit 730 is operating in the boost mode, first charge pump unit 740 receives a first charge pump control signal from power converter unit 730. The first charge pump control signal may allow first charge pump unit 740 to boost the voltage of the electrical signal passing through first charge pump unit 740. For example, the first charge pump control signal may represent an electrical signal that flows from node 738 to first capacitor 744A and third capacitor 744C, the first charge pump control signal controlling when first capacitor 744A and third capacitor 744C discharge. The first charge pump control signal may represent an electrical signal having one or more first phases and one or more second phases. During the one or more first phases, a voltage of the first charge pump control signal may be lower than a voltage of the first charge pump control signal during the one or more second phases. In some examples, during a first phase of the one or more first phases, capacitor 744A charges to a voltage of the first output signal generated by power converter unit 730 via first diode 742A. In response to the first charge pump control signal transitioning to a second phase of the one or more second phases that is subsequent to the first phase, a voltage at a top plate of first capacitor 744A may boost to two times the voltage of the first output signal generated by power converter unit 730. In turn, second capacitor 744B may charge to two times the voltage of the first output signal generated by power converter unit 730 via second diode 742B.

Subsequently, the first charge pump control signal may transition to another first phase of the one or more first phases, causing the second capacitor 744B to discharge, charging third capacitor 744C to two times the voltage of the first output signal generated by power converter unit 730. The first charge pump control signal may further transition to another second phase of the one or more second phases, causing a voltage at the top plate of third capacitor 744C to boost to three times the voltage of the first output signal generated by power converter unit 730. In turn, charge pump capacitor 790 may charge to three times the voltage of the first output signal generated by power converter unit 730 via fourth diode 742D. After the charge pump control transitions to another first phase of the one or more first phases, charge pump capacitor 790 discharges. In this way, a voltage of the second output signal generated by first charge pump unit 740 is three times the voltage of the first output signal generated by power converter unit 730, since charge pump capacitor 790 charges to three times the voltage of the first output signal.

When power converter unit 730 is operating in the buck mode, second charge pump unit 780 receives a second charge pump control signal from power converter unit 730. The second charge pump control signal may allow second charge pump unit 780 to boost the voltage of the electrical signal passing through second charge pump unit 780. For example, the second charge pump control signal may represent an electrical signal that flows from node 739 to first capacitor 784A and third capacitor 784C, the second charge pump control signal controlling when first capacitor 784A and third capacitor 784C discharge. The second charge pump control signal may represent an electrical signal having one or more first phases and one or more second phases. During the one or more first phases, a voltage of the second charge pump control signal may be lower than a voltage of the second charge pump control signal during the one or more second phases. In some examples, during a first phase of the one or more first phases, capacitor 784A charges to a voltage of the first output signal generated by power converter unit 730 via first diode 782A. In response to the second charge pump control signal transitioning to a second phase of the one or more second phases that is subsequent to the first phase, a voltage at a top plate of first capacitor 784A may boost to two times the voltage of the first output signal generated by power converter unit 730. In turn, second capacitor 784B may charge to two times the voltage of the first output signal generated by power converter unit 730 via second diode 782B.

Subsequently, the second charge pump control signal may transition to another first phase of the one or more first phases, causing the second capacitor 784B to discharge, charging third capacitor 784C to two times the voltage of the first output signal generated by power converter unit 730.

The second charge pump control signal may further transition to another second phase of the one or more second phases, causing a voltage at the top plate of third capacitor 784C to boost to three times the voltage of the first output signal generated by power converter unit 730. In turn, charge pump capacitor 790 may charge to three times the voltage of the first output signal generated by power converter unit 730 via fourth diode 782D. After the charge pump control transitions to another first phase of the one or more first phases, charge pump capacitor 790 discharges. In this way, a voltage of the second output signal generated by second charge pump unit 780 is three times the voltage of the first output signal generated by power converter unit 730, since charge pump capacitor 790 charges to three times the voltage of the first output signal.

In this way, first charge pump unit 740 may be used to generate a second output signal to deliver to linear regulator unit 750 when power converter unit 730 is operating in the buck mode. By the same token, second charge pump unit 780 may be used to generate the second output signal to deliver to linear regulator unit 750 when power converter unit 730 is operating in the boost mode.

Figure 8:
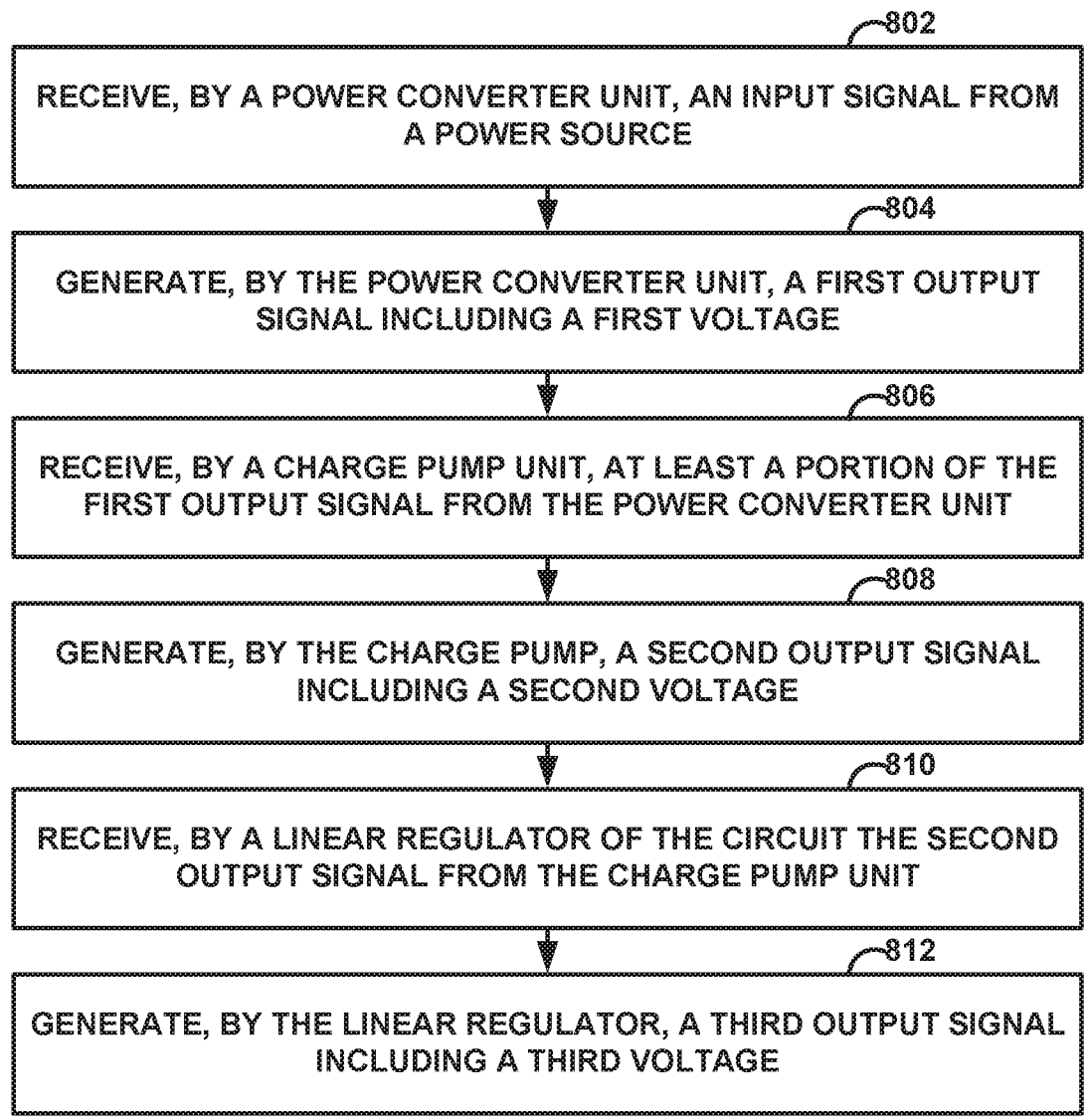
FIG. 8 is a flow diagram illustrating an example operation for generating one or more output signals to provide power to control one or more strings of LEDs, in accordance with one or more techniques of this disclosure.

FIG. 8 is a flow diagram illustrating an example operation for generating one or more output signals to provide power to control one or more strings of LEDs, in accordance with one or more techniques of this disclosure. For convenience, FIG. 8 is described with respect to system 100 of FIG. 1. However, the techniques of FIG. 8 may be performed by different components of system 100 or by additional or alternative systems.

As seen in the example operation of FIG. 8, power converter unit 130 is configured to receive an input signal from power source 110 (802). In some examples, the input signal includes a voltage and a current. Power source 110 may, in some cases, may be a rechargeable power source such as a battery. Power converter unit 130 may generate a first output signal including a first voltage (804). In some examples, power converter unit 130 represents a DC-to-DC converter. In some cases, power converter unit 130 may operate according to a buck mode. In some cases, power converter unit 130 may operate according to a boost mode. In some examples, power converter unit 130 may operate according to both of a buck mode and a boost mode. In any case, the first voltage of the first output signal generated by power converter unit 130 may be greater than or less than the voltage of the input signal, depending on whether power converter unit 130 is operating in the buck mode or operating in the boost mode. For example, if the power converter unit 130 is operating in the boost mode, the first voltage may be greater than the voltage of the input signal. If the power converter unit 130 is operating in the buck mode, the first voltage may be less than the voltage of the input signal. In some examples, in response to an LED control switching unit being activated, power converter unit 130 may supply at least a portion of the first output signal to a first string of LEDs, which may represent HB lighting and LB lighting on a vehicle. Power converter unit 130 may generate the first output signal such that the first voltage is sufficient to power the first string of LEDs.

Charge pump unit 140 receives at least a portion of the first output signal from power converter unit 130 (806). In turn, charge pump unit 140 generates a second output signal including a second voltage (808). In some examples, charge pump unit 140 may represent a Dickson charge pump that multiplies the voltage of the first output signal by an integer value. Charge pump unit 140 may receive a charge pump control signal that controls capacitors of charge pump unit 140 to charge and discharge in order to generate the second output signal. Linear regulator unit 150 may receive the second output signal from charge pump unit 140 (810) and generate a third output signal including a first voltage (812). Linear regulator unit 150 may generate the third output signal to have a constant voltage irrespective of the input voltage to linear regulator unit 150. Charge pump unit 140 may generate the second output signal such that a difference between the second voltage and the third voltage is relatively small as compared with systems in which a power converter and a charge pump are not included. In some examples, linear regulator unit 150 supplies at least a portion of the third output signal to a second string of LEDs which represent DRL lighting and POS lighting on a vehicle.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The following numbered examples demonstrate one or more aspects of the disclosure.

Example 1

A circuit is configured to control current through one or more strings of light-emitting diodes (LEDs). The circuit includes a power converter unit configured to: receive an input signal from a power source; and generate a first output signal comprising a first voltage; a charge pump configured to: receive at least a portion of the first output signal from the power converter unit; and generate a second output signal comprising a second voltage; and a linear regulator configured to: receive the second output signal from the charge pump; and generate a third output signal comprising a third voltage.

Example 2

The circuit of example 1, where the power converter unit is further configured to: deliver, while an LED control switching element is activated, at least a portion of the first output signal to a first string of LEDs.

Example 3

The circuit of any of examples 1-2, where to deliver at least the portion of the first output signal to the first string of LEDs, the power converter unit is configured to: regulate a current of the at least the portion of the first output signal delivered to the first string of LEDs such that a current of the at least the portion of the first output signal remains substantially constant while the LED control switching element is activated.

Example 4

The circuit of any of examples 1-3, where the linear regulator is further configured to deliver at least a portion of the third output signal to a second string of LEDs.

Example 5

The circuit of any of examples 1-4, where the linear regulator is further configured to: deliver, while the LED control switching element is deactivated, at least a portion of the third output signal to a second string of LEDs.

Example 6

The circuit of any of examples 1-5, where the power converter unit includes a power converter switching device and an inductor, where while the power converter switching device is activated, the power converter unit is configured to: charge the inductor while the power converter switching device is activated; and discharge the inductor while the power converter switching device is deactivated to generate the first output signal, where the power converter unit boosts a voltage of the input signal to generate the first output signal.

Example 7

The circuit of any of examples 1-6, where the power converter unit is further configured to: generate a charge pump control signal, the charge pump control signal including one or more first phases corresponding to the power converter switching device being activated and one or more second phases corresponding to the power converter switching device being deactivated, and where the charge pump is configured to: generate the second output signal based on the charge pump control signal, where to generate the second output signal, the charge pump is configured to boost the first voltage of the first output signal.

Example 8

The circuit of any of examples 1-7, where the charge pump includes a first capacitor and a second capacitor, and where to generate the second output signal, the charge pump is configured to: charge, during each first phase of the one or more first phases, the first capacitor to the first voltage; and charge, during each second phase of the one or more second phases, the second capacitor to the second voltage.

Example 9

The circuit of any of examples 1-8, where the charge pump includes one stage of multiplication, and where the second voltage is within a range from 1.9 times the first voltage to 2.1 times the first voltage.

Example 10

The circuit of any of examples 1-9, where the charge pump includes two stages of multiplication, and where the second voltage is within a range from 2.9 times the first voltage to 3.1 times the first voltage.

Example 11

The circuit of any of examples 1-10, where first output signal includes a first current within a range from 50 milliamperes (mA) to 1,500 mA, and where the third output signal includes a second current within a range from 50 mA to 1,500 mA.

Example 12

The circuit of any of examples 1-11, where to generate the third output signal, the linear regulator is configured to buck a voltage of the second output signal to generate the third output signal, where a difference between the second voltage and the third voltage is smaller than a difference between the first voltage and the second voltage.

Example 13

The circuit of any of examples 1-12, where the charge pump is configured to limit a difference between the second voltage and a third voltage such that the difference between the second voltage and the third voltage remains below a voltage difference threshold value.

Example 14

The circuit of any of examples 1-13, where the power converter includes a direct current-to-direct current (DC-to-DC) converter.

Example 15

The circuit of any of examples 1-14, where the DC-to-DC converter includes an H-bridge unit.

Example 16

A method includes receiving, by a power converter unit of a circuit configured to control current through one or more strings of light-emitting diodes (LEDs), an input signal from a power source; generating, by the power converter unit, a first output signal including a first voltage; receiving, by a charge pump of the circuit, at least a portion of the first output signal from the power converter unit; generating, by the charge pump, a second output signal including a second voltage; receiving, by a linear regulator of the circuit, the second output signal from the charge pump; and generating, by the linear regulator, a third output signal including a third voltage.

Example 17

The method of example 16, further including delivering, while an LED control switching element is activated, at least a portion of the first output signal to a first string of LEDs.

Example 18

The method of any of examples 16-17, where the method further includes: delivering, by the linear regulator, at least a portion of the third output signal to a second string of LEDs.

Example 19

The method of any of examples 16-18, where the method further includes: delivering, while the LED control switching element is deactivated, at least a portion of the third output signal to a second string of LEDs.

Example 20

A system including: a power source; a first string of LEDs; a second string of LEDs; and a circuit configured to control current through the first string of LEDs and the second string of LEDs, the circuit including: a power converter unit configured to: receive an input signal from the power source; and generate a first output signal including a first voltage; a charge pump configured to: receive at least a portion of the first output signal from the power converter unit; and generate a second output signal including a second voltage; and a linear regulator configured to: receive the second output signal from the charge pump; and generate a third output signal including a third voltage.

Various examples of the disclosure have been described. These and other examples are within the scope of the following claims.

What is claimed is:

1. A circuit configured to control current through one or more strings of light-emitting diodes (LEDs), the circuit comprising:
a power converter unit configured to:
receive an input signal from a power source; and
generate a first output signal comprising a first voltage;
a charge pump configured to:
receive at least a portion of the first output signal from the power converter unit; and
generate a second output signal comprising a second voltage; and
a linear regulator configured to:
receive the second output signal from the charge pump; and
generate a third output signal comprising a third voltage.

2. The circuit of claim 1, wherein the power converter unit is further configured to:
deliver, while an LED control switching element is activated, at least a portion of the first output signal to a first string of LEDs.

3. The circuit of claim 2, wherein to deliver at least the portion of the first output signal to the first string of LEDs, the power converter unit is configured to:
regulate a current of the at least the portion of the first output signal delivered to the first string of LEDs such that a current of the at least the portion of the first output signal remains substantially constant while the LED control switching element is activated.

4. The circuit of claim 2, wherein the linear regulator is further configured to deliver at least a portion of the third output signal to a second string of LEDs.

5. The circuit of claim 2, wherein the linear regulator is further configured to:
deliver, while the LED control switching element is deactivated, at least a portion of the third output signal to a second string of LEDs.

6. The circuit of claim 1, wherein the power converter unit comprises a power converter switching device and an inductor, wherein while the power converter switching device is activated, the power converter unit is configured to:
charge the inductor while the power converter switching device is activated; and
discharge the inductor while the power converter switching device is deactivated to generate the first output signal, wherein the power converter unit boosts a voltage of the input signal to generate the first output signal.

7. The circuit of claim 6, wherein the power converter unit is further configured to:
generate a charge pump control signal, the charge pump control signal including one or more first phases corresponding to the power converter switching device being activated and one or more second phases corresponding to the power converter switching device being deactivated, and wherein the charge pump is configured to:
generate the second output signal based on the charge pump control signal, wherein to generate the second output signal, the charge pump is configured to boost the first voltage of the first output signal.

8. The circuit of claim 7, wherein the charge pump comprises a first capacitor and a second capacitor, and wherein to generate the second output signal, the charge pump is configured to:
charge, during each first phase of the one or more first phases, the first capacitor to the first voltage; and
charge, during each second phase of the one or more second phases, the second capacitor to the second voltage.

9. The circuit of claim 8, wherein the charge pump comprises one stage of multiplication, and wherein the second voltage is within a range from 1.9 times the first voltage to 2.1 times the first voltage.

10. The circuit of claim 7, wherein the charge pump comprises two stages of multiplication, and wherein the second voltage is within a range from 2.9 times the first voltage to 3.1 times the first voltage.

11. The circuit of claim 2, wherein first output signal comprises a first current within a range from 50 milliamperes (mA) to 1,500 mA, and wherein the third output signal comprises a second current within a range from 50 mA to 1,500 mA.

12. The circuit of claim 1, wherein to generate the third output signal, the linear regulator is configured to buck a voltage of the second output signal to generate the third output signal, wherein a difference between the second voltage and the third voltage is smaller than a difference between the first voltage and the second voltage.

13. The circuit of claim 1, wherein the charge pump is configured to limit a difference between the second voltage and a third voltage such that the difference between the second voltage and the third voltage remains below a voltage difference threshold value.

14. The circuit of claim 1, wherein the power converter comprises a direct current-to-direct current (DC-to-DC) converter.

15. The circuit of claim 12, wherein the DC-to-DC converter comprises an H-bridge unit.

16. A method comprising:
receiving, by a power converter unit of a circuit configured to control current through one or more strings of light-emitting diodes (LEDs), an input signal from a power source;
generating, by the power converter unit, a first output signal comprising a first voltage;

receiving, by a charge pump of the circuit, at least a portion of the first output signal from the power converter unit;

generating, by the charge pump, a second output signal comprising a second voltage;

receiving, by a linear regulator of the circuit, the second output signal from the charge pump; and generating, by the linear regulator, a third output signal comprising a third voltage.

17. The method of claim 16, further comprising:
delivering, while an LED control switching element is activated, at least a portion of the first output signal to a first string of LEDs.

18. The method of claim 17, wherein the method further comprises:
delivering, by the linear regulator, at least a portion of the third output signal to a second string of LEDs.

19. The method of claim 17, wherein the method further comprises:
delivering, while the LED control switching element is deactivated, at least a portion of the third output signal to a second string of LEDs.

20. A system comprising:
a power source;
a first string of LEDs;
a second string of LEDs; and
a circuit configured to control current through the first string of LEDs and the second string of LEDs, the circuit comprising:
a power converter unit configured to:
  receive an input signal from the power source; and
  generate a first output signal comprising a first voltage;
a charge pump configured to:
  receive at least a portion of the first output signal from the power converter unit; and
  generate a second output signal comprising a second voltage; and
a linear regulator configured to:
  receive the second output signal from the charge pump; and
  generate a third output signal comprising a third voltage.

* * * * *